May 26, 1959     H. P. HUGHES ET AL     2,887,880
FLUID REPLENISHER AND COMBINED INDICATOR AND
SIGNAL FOR HYDRAULIC BRAKE SYSTEMS
Filed June 14, 1956     2 Sheets-Sheet 1
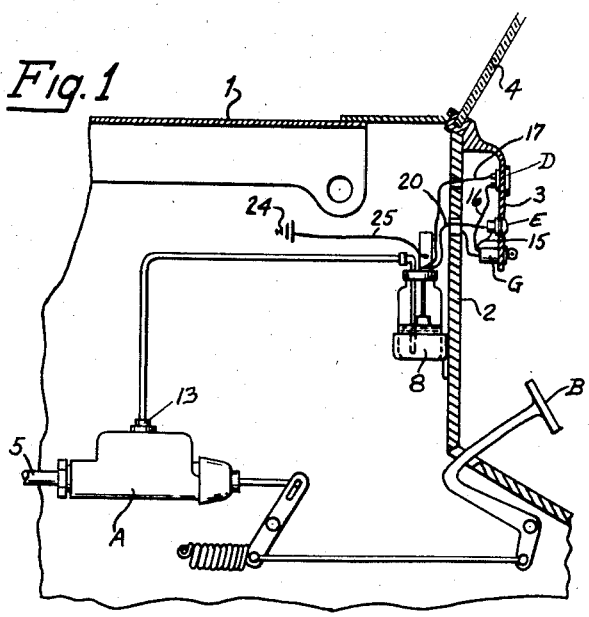
Fig. 1
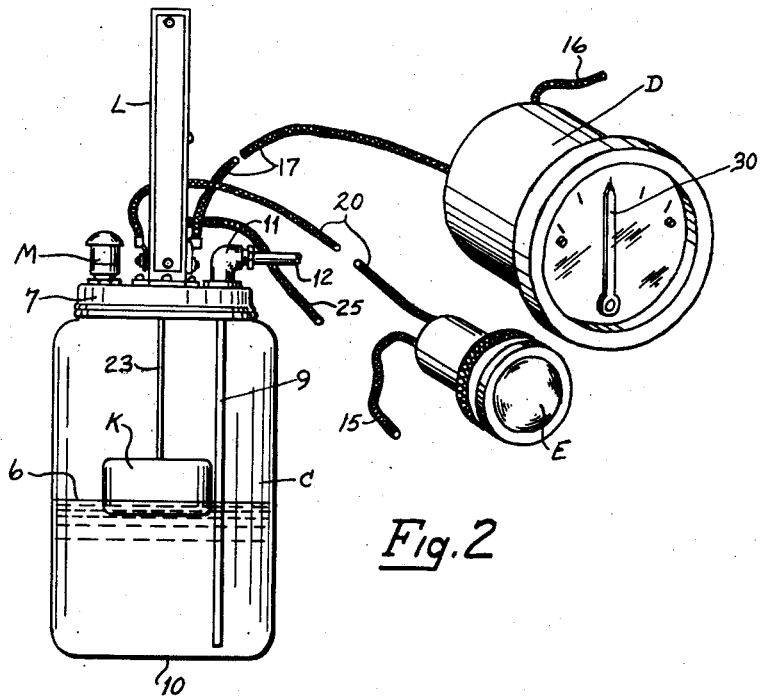
Fig. 2
INVENTOR.
N. W. WHITE, JR. & H. PRESTON HUGHES
BY
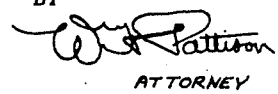
ATTORNEY May 26, 1959     H. P. HUGHES ET AL     2,887,880
FLUID REPLENISHER AND COMBINED INDICATOR AND
SIGNAL FOR HYDRAULIC BRAKE SYSTEMS
Filed June 14, 1956     2 Sheets-Sheet 2
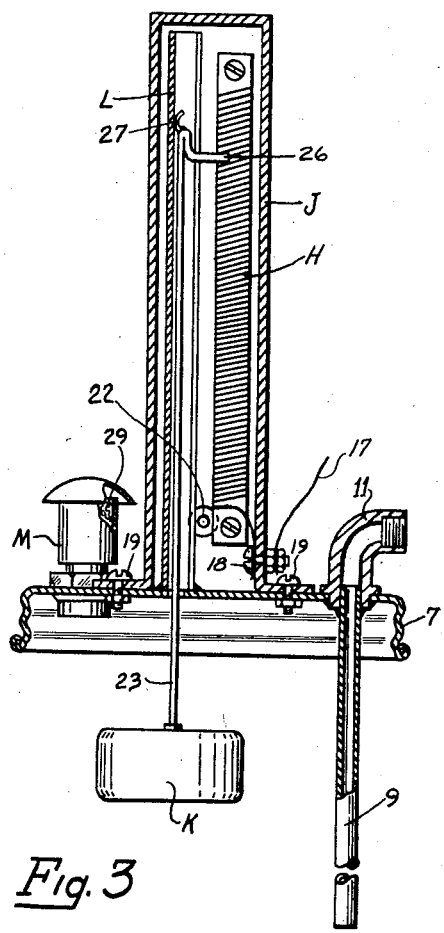
Fig. 3
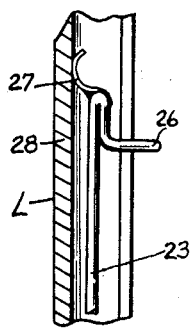
Fig. 5
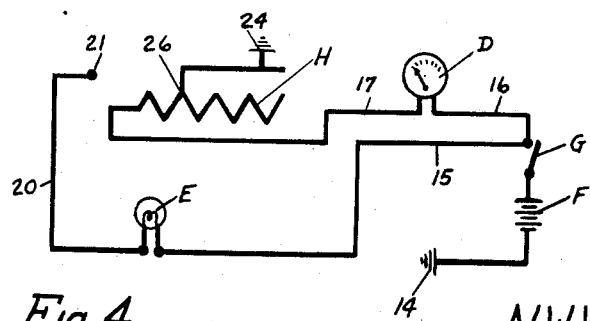
Fig. 4
INVENTOR.
N. W. WHITE, JR. & H. PRESTON HUGHES
BY
ATTORNEY United States Patent Office 2,887,880
Patented May 26, 1959

2,887,880

FLUID REPLENISHER AND COMBINED INDICATOR AND SIGNAL FOR HYDRAULIC BRAKE SYSTEMS

Hargis P. Hughes and Naret M. White, Prestonburg, Ky.

Application June 14, 1956, Serial No. 591,447

2 Claims. (Cl. 73—313)

This invention relates to a combined indicator and signal for hydraulic systems and provides an arrangement which both automatically replenishes the brake fluid in the system and warns the driver of the vehicle of the likelihood of the failure of the vehicle brakes due to the lack of sufficient fluid in the brake system.

The primary object of the invention is the provision of a safety device in conjunction with the hydraulic brake system of a vehicle and to provide such device which can be quickly, easily and quite cheaply installed on vehicles now in use as well as incorporated into the vehicles when they are originally manufacturerd.

A very large percentage of accidents of vehicles on the roads today is brought about by the failure of the hydraulic brake system due to insufficient brake fluid in the system, and an object of the present invention is to provide a reservoir of brake fluid which will automatically replenish the fluid in the braking system by delivery of fluid to the master cylinder as the fluid level in the system drops.

Another object of the invention is to provide an arrangement which constantly indicates to the vehicle driver the level of the brake liquid in the reservoir and to also so position and arrange the reservoir that the liquid level therein is immediately visibly discernible when the hood of the car is opened.

Another and further object of the invention is the provision of a device for use with the hydraulic brake system of a vehicle which warns or signals the vehicle driver when the vehicle fluid in the reservoir is completely depleted and therefore unable to replenish the system.

Another and further object of the invention is the provision of a filter in conjunction with the reservoir to assist in keeping dirt and dust out of the brake system.

Other objects and advantages of the invention will appear from the following description when read in the light of the accompanying drawings.

In the drawings:

Fig. 1 is a view in vertical section through the rear end of an automobile engine hood, the invention being illustrated in full lines.

Fig. 2 is a view in side elevation of the invention, the view being partly schematic in nature.

Fig. 3 is a view in vertical section through the reservoir cap and the structure carried thereby.

Fig. 4 is the electric circuit utilized in the invention.

Fig. 5 is a fragmentary view, partly in vertical section, illustrating the upper end of the float rod.

An embodiment of the invention is illustrated in the drawings, but departures therefrom can be made without departing from the inventive concept.

Referring to Fig. 1, 1 is the swing-up hood of an automobile, 2 is the dash or rear closure of the hood, 3 is the dash board, and 4 is the windshield.

The invention is utilized in conjunction with the hydraulic brake systems of a vehicle. It is not necessary that the braking system be of any specific type, and inasmuch as such systems are well understood specific description of the braking system is unnecessary. Accordingly the braking system is only partially shown and that part appearing in the drawings is the master cylinder A having therein a plunger, not shown, which is operable by the brake pedal B. A brake fluid conducting conduit 5 extends from the master cylinder and is connected in the conventional manner to the brakes of the vehicle.

Everything thus far described is conventional and well known construction.

The invention specifically comprises a reservoir C which is made of some suitable transparent material so that the level of the brake fluid 6 therein will be immediately visible when the car hood 1 is raised, as it is periodically for a check-up of the engine oil level and the need for water in the vehicle cooling system. The reservoir is closed by a removable threaded cap 7. The reservoir is supported on the hood side of the dash 2 in some suitable support such as a cup 8. An outlet pipe 9 extends downwardly into the reservoir and stops just short of the bottom 10 thereof. The upper end of this pipe is connected to a fitting 11 on the upper surface of the cap to which is attached a suitable flexible pipe 12 which runs to and is connected with the master brake cylinder as at 13. The reservoir is supported in a horizontal plane above the master cylinder and consequently as long as brake fluid 6 is in the reservoir it will be fed to the master cylinder should any braking fluid be lost from the braking system. It will therefore be seen that the reservoir will assure that the braking system is at all times filled with brake fluid.

As brake failure is due in a great many instances to lack of fluid in the braking system, provision is made to doubly warn the driver of the vehicle when the reservoir becomes empty of brake fluid so that it can no longer service the braking system.

The warnings or signals to the vehicle driver are dual in nature and comprise a liquid level indicating gauge D and a light E. An audible signal could be substituted for the visible warning light E. Both the gauge and the warning signal are electrically operated and current for their operation is provided by the usual vehicle battery, as will now be explained.

The electric battery F of the vehicle, see Fig. 4, is grounded as at 14. The battery, as is conventional, is connected to the key operated ignition switch G on the dash of the vehicle. A current conducting wire 15 connects the signal switch to the warning light E and a second conductor 16 connects the signal switch with the gauge D. From the gauge D a conductor 17 is connected as at 18 to the lower end of a vertically disposed elongated variable resistor H which is disposed within a metallic housing J secured to the metallic reservoir cap 7 by bolts 19 or the like. From the light E a current conducting wire 20 extends to a contact 21 which has a pin 22 extending inwardly from the housing J, see Fig. 3. The purpose of this pin will hereinafter appear.

A float K within the reservoir rises and falls with the level of the brake fluid in the reservoir. The float is provided with an elongated float rod 23 which extends into and is guided by a guide tube L within the housing J. This guide tube is metallic and has electrical contact at its lower end with the reservoir cap 7. The housing J is connected to a ground 24 by a current conducting wire 25. In Fig. 1 this ground is schematically illustrated and could be grounded at any convenient place on the engine or vehicle chassis.

The upper end of the float rod is bent to provide an outwardly extending finger contact 26 which travels over the variable resistor coil H. Electrical contact between the finger and the ground 24 is maintained by a metallic resilient contact 27 carried by the upper end of the float rod and which bears on the inner face of the rear wall 28 of the guide 12.

The reservoir is provided with an air inlet M carried by the reservoir cap 7. This air intake is provided internally with a suitable filter 29 which can be in the nature of fibre glass or any other suitable filtering material. This filter prevents the passage of dirt or dust into the reservoir but should any foreign matter get into the reservoir it will settle to the bottom thereof and by reason of the outlet pipe 9 stopping short of the reservoir bottom this foreign matter will not get into the hydraulic brake system. This is desirable as dirt and grime can gum up the system and necessitate costly repairs.

The operation of the device is quite simple. Immediately the ignition is turned on the gauge D will indicate the level of the brake liquid in the reservoir, as for instance in Fig. 2 the indicator hand 30 is indicating that the reservoir is half filled. As the electric circuit to the gauge is always closed when the ignition is on the level of brake fluid in the reservoir is always visible to the driver when the car is being operated. At the level of liquid falls and the float K moves downwardly the finger 26 moves downwardly on the variable resistor and as it does so the reading on the gauge, will fall. When the float substantially reaches the bottom of its travel the finger 26 will pass off of the variable resistor but will almost immediately engage the pin contact 22. When this occurs the circuit to the electric light is closed and the light will be illuminated and warn the driver that the reservoir is empty of brake fluid. Thus the driver has a double warning of the fluid level in the reservoir in addition to the fact that as the hood is opened from time to time the liquid level in the reservoir is visible.

With a device such as has been described there would be little likelihood of the vehicle driver permitting the reservoir to become empty or remain empty and thus the likelihood of brake failure by reason of lack of brake fluid is substantially entirely overcome. Additionally, if the liquid level gauge falls rapidly or often it is a warning to the vehicle operator that there is a leak in the brake system and that it should be given immediate attention.

What we claim is:

1. For use with a hydraulic brake system having a master cylinder, a brake fluid carrying reservoir having constant communication with the master cylinder for delivery of brake fluid thereto, the reservoir having a removable metallic filler cap, an elongated metallic housing extending upwardly from the top of the cap and being secured in electrical contact therewith, an elongated variable resistor vertically disposed and supported within the housing and out of electrical contact therewith, a metallic elongated guide tube within the housing and disposed in spaced parallel relationship to the resistor and in spaced relationship to the side walls of the housing, said tube extending upwardly from the top of the cap and being secured in electrical contact therewith, the metallic housing being electrically grounded and thereby grounding the reservoir cap and the guide tube, a float in the reservoir, a metallic float rod extending upwardly from the float through the reservoir cap and into the housing, the float rod having a current conducting contact with the grounded guide tube, a source of electric current, an electrically operable indicator, one pole of said current source being grounded, the other pole of the current source being connected to one pole of the indicator, and the other pole of the indicator being electrically connected to the lower end of the variable resistor.

2. An arrangement as defined in claim 1 wherein, the upper end of the float rod is provided at one side with an extending finger which constitutes the current conducting contact element which contacts the variable resistor, and said rod end also being provided with a metallic resilient contact element having sliding electrical contact with the guide tube.

References Cited in the file of this patent
UNITED STATES PATENTS

| | | |
|---|---|---|
| Re. 18,723 | Hirschler | Jan. 31, 1933 |
| 1,564,701 | Mattingly | Dec. 8, 1925 |
| 2,623,143 | Laury | Dec. 23, 1952 |
| 2,653,564 | Benefield | Sept. 29, 1953 |
| 2,738,674 | Perkins | Mar. 20, 1956 |